United States Patent [19]
Burkett et al.

[11] Patent Number: 5,182,564
[45] Date of Patent: Jan. 26, 1993

[54] GUIDANCE APPARATUS WITH DUAL MODE SENSOR

[75] Inventors: Fred T. Burkett; Jerome G. Bronson, both of Seattle; Robert G. Heeren, Tacoma, all of Wash.

[73] Assignee: The Boeing Company, Seattle, Wash.

[21] Appl. No.: 634,548

[22] Filed: Jul. 26, 1984

[51] Int. Cl.$^5$ .............................................. G01S 13/00
[52] U.S. Cl. ...................................... 342/53; 343/720
[58] Field of Search ................... 343/6 ND, 725, 729, 343/720; 342/53

[56] References Cited

U.S. PATENT DOCUMENTS

| | | | |
|---|---|---|---|
| 2,972,743 | 2/1961 | Svensson et al. | 343/6 ND |
| 3,701,158 | 10/1972 | Johnson | 343/725 |
| 3,921,177 | 11/1975 | Munson . | |
| 3,987,455 | 10/1976 | Olyphant, Jr. . | |
| 4,054,874 | 10/1977 | Oltman, Jr. . | |
| 4,264,907 | 4/1981 | Durand, Jr. et al. | 343/6 ND |
| 4,282,527 | 8/1981 | Winderman et al. | 343/6 ND X |
| 4,477,814 | 10/1984 | Brumbaugh et al. | 343/6 ND X |

OTHER PUBLICATIONS

Taylor et al., "An Infrared Alternative: Vapor-Deposited Materials" pp. 41–43, Laser Focus Magazine, Jul. 1981.
Klein et al., "Chemically vapor-deposited zinc sulfide infrared windows: optical properties and physical characters" pp. 85–94 SPIE vol. 204 Physical Properties of Optical Materials (1979).
Huebner, "An Electrically Small Microstrip Dipole Planar Array", pp. 17-1 Through 17-16, proceedings of the Workshop on Printed Circuit Antenna Technology, New Mexico State University, Las Cruces, New Mexico, Oct. 17 through 19, 1979.
Oltman et al., "Electromagnetically Coupled Microstrip Dipoles", pp, 151–157, IEEE Transactions On Antennas and Propagation, AP-29, Jan. 1981.
Elliott et al., "The Design of Microstrip Dipole Arrays Including Mutual Coupling: Part I Theory, Part II Experiment", pp. 757–765, IEEE Transactions on Antennas and Propagation AP-29, No. 1, Jan. 1981.
Munson, "Conformal Microstrip Antennas and Microstrip Phased Arrays", pp. 74–78 IEEE Transactions on Antennas and Propagation, Jan. 1974.
Mailloux et al., "Microstrip Array Technology", pp. 15–37, IEEE Transactions on Antennas and Propagation AP-29, No. 1, Jan. 1981.
Levitan, "MM-Wave and Infrared", pp. 100–103, Military Electronics/Countermeasures, Feb. 1982.

*Primary Examiner*—Mark Hellner
*Attorney, Agent, or Firm*—J. Michael Neary

[57] ABSTRACT

Guidance apparatus for a tactical guided missile uses a dual-mode sensor having both active millimeter wavelength RF sensing capability and passive infrared sensing capability within a single aperture. A dual reflector-antenna assembly is formed by chemical vapor deposition of dielectric material transparent to infrared and RF radiation. Embedded within the reflector assembly is an RF microstrip antenna array, formed by thin-film metalization techniques, which defines an antenna beam axis. A surface of the reflector assembly is ground, optically polished, and coated with infrared reflective material to form a primary reflecting surface of a Cassegrainian optical system, which also includes a secondary mirror, for defining an infrared detection beam axis coincident with the antenna beam axis. Infrared radiation from a target is concentrated by the Cassegrainian optical system onto an infrared detector to produce a first guidance signal. RF energy is supplied to the antenna array to be transmitted to and reflected from a target. Reflected RF radiation from the target is received by the antenna array to produce a second guidance signal.

19 Claims, 4 Drawing Sheets

FIG. 4

GUIDANCE APPARATUS WITH DUAL MODE SENSOR

BACKGROUND OF THE INVENTION

The present invention relates to guidance apparatus and, more particularly, to guidance apparatus having a dual electro-optical and radio frequency sensing capability especially suitable for tactical guided missiles.

Tactical guided missiles are used in a variety of military applications to provide the capability to attack targets in the air and on the surface. In each application, some type of target sensing capability is required. Known sensing apparatus includes both active systems which generate and transmit various types of radiation and develop guidance signals based on reflections obtained from a target, and passive systems which develop guidance signals from radiation generated directly by the target itself.

The type of radiation sensed in both active and passive systems is dependent upon the particular application. For example, some systems known in the art have the capability to sense radiation in the visible electro-optical spectrum (i.e., television systems). Other known systems sense infrared radiation generated by the exhaust from the engines of aircraft or armored vehicles, or radio frequency radiation of various wavelengths either generated or reflected by the target.

Each type of sensor and each radiation frequency has advantages and disadvantages. For example, extremely short wavelength radio frequency active systems (commonly known as millimeter-wavelength radar systems) are able to provide guidance to targets in all weather, to accurately determine the distance to a target, and exhibit insensitivity to infrared countermeasures. However, such active radio frequency systems provide limited discrimination between multiple targets, are limited in angular resolution, and are unable to provide guidance information at very close distances to the target. On the other hand, passive electro-optical guidance systems provide good target discrimination and high resolution of target details, and are able to provide guidance signals almost up to the point of impact with the target. Such passive electro-optical systems are immune to radio frequency jamming but are ineffective under conditions of poor visibility from, for example, clouds, precipitation, or dust. Furthermore, they are unable to provide information regarding the distance to the target, and are susceptible to countermeasures such as exhaust shielding and decoy flares.

It can be seen that the characteristics of active radio frequency guidance systems and passive electro-optical guidance systems can be complementary. Accordingly, a first objective of the invention is to provide guidance apparatus employing both an active radio frequency guidance system and a passive electro-optical guidance system.

Various systems for providing such a dual-mode guidance apparatus are known in the prior art. One approach has been to combine two existing guidance systems, such as placing the infrared guidance sensor of the Redeye missile inside the active radio frequency seeker of the Hawk missile. Another similar effort involved the placing of an "eggcrate" radio frequency antenna behind a separate infrared sensor. Yet another dual-mode system in the prior art employs a forward looking infrared seeker under one protective cover (or aperture) in conjunction with a side-looking radio frequency system under another aperture. Although some benefits are obtainable using such a segmented aperture system, the two sensors do not view the target in the same perspective, and pointing problems may occur in the changeover from one system to another, since the sensors are not looking at the same plane.

Another approach to a dual-mode sensor has been proposed using radio frequency optics having dichroic elements. Dichroic elements selectively transmit or reflect radiation, depending upon the frequency of the radiation. Suitable dichroic elements are known which can perform over a frequency separation of several octaves; that is, one frequency is a multiple of two or three times the other frequency. However, dichroic elements are not yet available which can effectively operate over the wavelength ratios of well over one thousand that a dual-mode millimeter wave radio frequency/electro-optical guidance system would require.

Microstrip radio frequency antennas provide attractive features for use in a dual-mode guidance system for a tactical guided missile. Such antennas employ a large number of flat antenna elements arranged in an array. However, conventional microstrip antennas on polymeric microwave substrates are difficult to form into the type of optical configurations which are desirable for use with an infrared sensor. Furthermore, conventional printed circuit board fabrication techniques used in microstrip antennas have limitations in the gain which can be achieved, due to surface roughness of the elements.

Accordingly, another objective of the invention is to provide guidance apparatus which will provide a dual-mode sensing capability including an active radio frequency guidance system and a passive electro-optical guidance system which can utilize a common aperture and provide coincident detection beams for both the radio frequency system and the electro-optical system. Yet another objective of the invention is to provide such a system which is mechanically rugged yet which exhibits high gain and efficient performance.

SUMMARY OF THE INVENTION

The present invention achieves the desired objectives of providing guidance apparatus employing a microstrip antenna in a dual-mode guidance system while overcoming the problems and disadvantages of the prior art. This is achieved by providing a radio frequency antenna of microstrip configuration which is fabricated upon electro-optical collecting optics using integrated circuit-type chemical-vapor-deposition (CVD) and metalization techniques. The electro-optical collecting optics are formed of a substrate material which is transparent in the desired portion of the electro-optical spectrum, such as zinc selenide or zinc sulfide which are transparent to infrared radiation. A solid integrated unit providing both passive electro-optical detection capability and an active radio frequency capability with coincident detection beams is thus provided.

Additional objects and advantages of the invention will be set forth in part in the description that follows and are in part obvious from the description or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, the guidance apparatus of this invention provides a window transparent to both electro-optical and radio frequency radiation, an electro-optical radiation detector positioned behind the window and producing a first guidance signal upon detection of electro-optical radiation from a target, and a dual reflector-antenna assembly positioned behind the window. The dual reflector-antenna assembly includes a substrate of dielectric material formed by a chemical vapor deposition process, a plurality of radio frequency antenna elements formed upon the substrate and arranged in a curvilinear array to define an antenna beam axis, and reflective means reflective to electro-optical radiation and supported upon the substrate for receiving electro-optical radiation transmitted through the window, and for concentrating the transmitted electro-optical radiation upon the electro-optical radiation detector to define an electro-optical detection beam axis coincident with the antenna beam axis. The apparatus further includes transmission means coupled to the radio frequency antenna elements for supplying radio frequency energy generated by associated transmitter apparatus to the radio frequency antenna elements to form a beam of radio frequency radiation along the antenna beam axis. The transmission means also supplies a second guidance signal to associated receiving apparatus, the second guidance signal corresponding to radio frequency radiation reflected from a target through the window along the antenna beam axis.

In a preferred embodiment, the antenna elements are formed as microstrip antenna elements by a thin-film metalization process upon the substrate. The antenna elements are resonant at frequencies in the millimeter wave range. The front surface of the dual reflector-antenna assembly is optically formed into a primary reflecting surface of a Cassegrainian optical system, the surface being reflective to infrared radiation and transparent to radio frequency radiation. A secondary infrared reflector is also included in the apparatus to direct infrared radiation through a transmissive portion of the reflective surface onto the electro-optical radiation detector which in the preferred embodiment comprises an infrared detector array positioned upon the assembly in the focal plane of the Cassegrainian optical system. Further, in the preferred embodiment, the transmission means comprises a serpentine transmission line coupled to the antenna elements to permit electronic scanning.

The accompanying drawings which are incorporated in and constitute a part of this specification, illustrate embodiments of the invention, and, together with the description, serve to explain the principles of the invention.

DESCRIPTION OF THE PREFERRED EMBODIMENT

Reference will now be made in detail to the presently preferred embodiment of the invention, an example of which is illustrated in the accompanying drawings.

Figure 1:
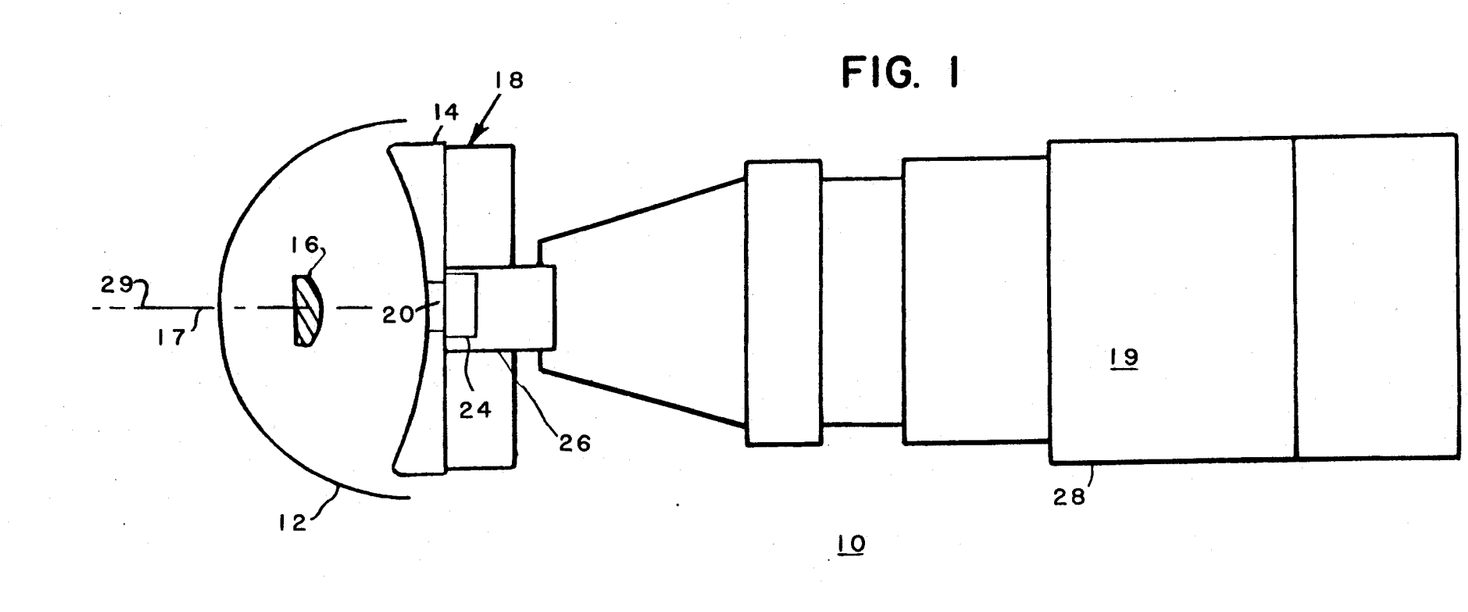
FIG. 1 is a side view of a guidance apparatus which incorporates a preferred embodiment of the present invention.

The preferred embodiment of the guidance apparatus shown in FIG. 1 is represented generally by numeral 10. Apparatus 10 is housed in a missile body (not shown) and views the outside environment through a protective window 12 of material transparent to both infrared and radio frequency radiation. Window 12 thus functions as both a radome and an IRdome. In certain applications the environmental protection functions of window 12 may not be required. In such cases, other means are used to provide a clear field of view for both radio frequency radiation and electro-optical radiation. Behind window 12 is a dual reflector-antenna assembly 14 which includes both a microstrip radio frequency antenna and an infrared reflective surface, to be described later in greater detail. Mounted between window 12 and assembly 14 is an infrared secondary refector 16 supported upon positioning struts, not shown.

Electronic circuitry including integrated millimeter wave radio frequency front-end circuitry 18 is mounted directly behind assembly 14. Front end circuitry 18 includes both transmitting and receiving circuitry which interfaces with a radio frequency antenna formed in the assembly 14. Centered within the front-end circuitry 18 directly behind a region 20 of assembly 14 transparent to infrared radiation is an imaging array of elements forming an electro-optical radiation detector 24. In a preferred embodiment, region 20 is an aperture extending through reflector assembly 14, as shown in FIG. 1, and detector 24 comprises an imaging array of infrared-sensitive elements.

A mechanical gimbal assembly 26 is attached to the structure consisting of assembly 14, front end circuitry 18, and detector 24. Gimbal assembly 26 provides a pivot point on the interface between assembly 14 and the front-end circuitry 18 to permit the assembly 14 to be mechanically scanned. Additional electronic circuitry 28 connected to front-end circuitry 18 is contained in a housing 19 positioned directly behind gimbal assembly 26. Circuitry 28 includes transmitting circuitry which generates radio frequency energy to be supplied through the front-end circuitry 18 to an antenna in the assembly 14 to provide radio frequency radiation along an antenna beam axis 29, as will be more completely described hereinafter. Electronic circuitry 28 also includes receiving circuitry for processing a guidance signal corresponding to radio frequency radiation reflected from a target through window 12 along antenna beam axis 29. Assembly 14 and secondary reflector 16 form a Cassegrainian optical system which concentrates infrared radiation transmitted through window 12 onto detector 24 to define an electro-optical detection beam axis 17 coincident with antenna beam axis 29. Detector 24 is positioned in the optical focal plane of the Cassegrainian optical system.

Figure 2:
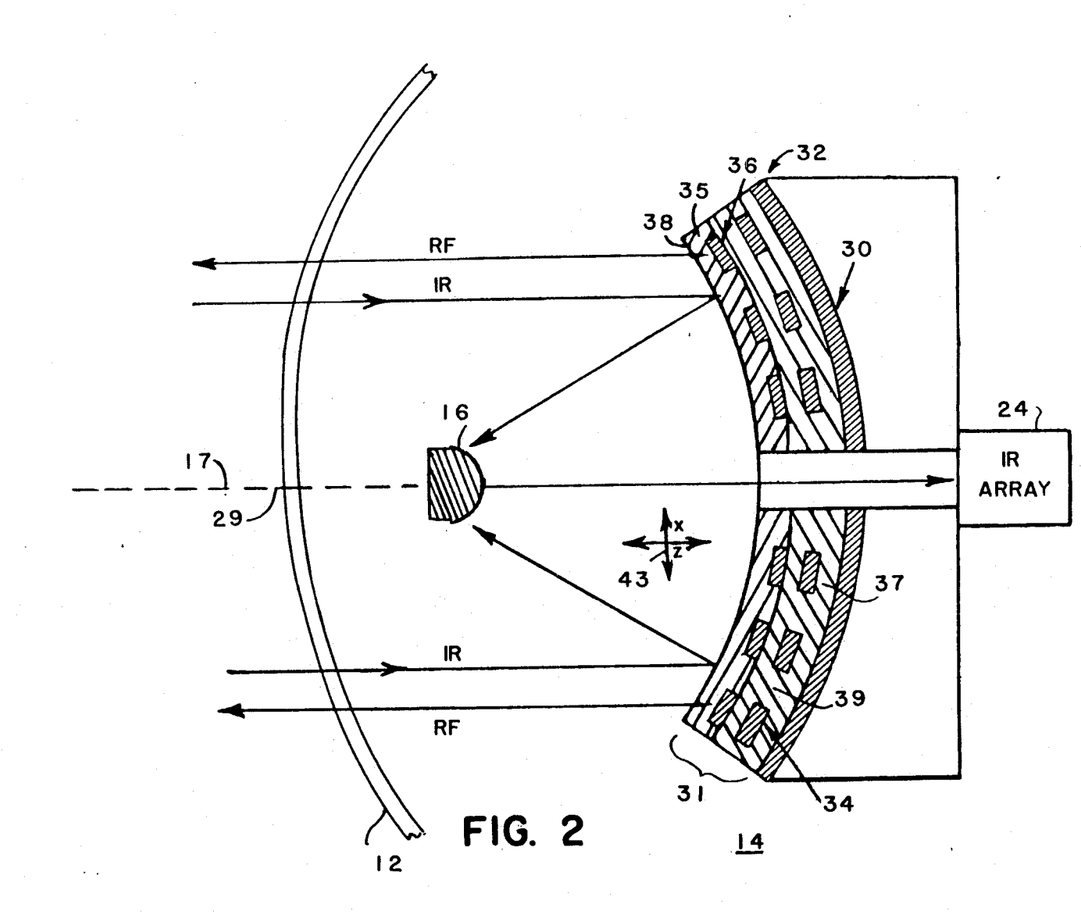
FIG. 2 is a detailed side view, partially schematic, of the apparatus of FIG. 1.

Referring now to FIG. 2, the reflector assembly 14 is shown schematically in greater detail. As can be seen in FIG. 2, assembly 14 includes a base 30 which supports a substrate 31, formed by the chemical vapor deposition of dielectric material such as zinc selenide or zinc sulfide. Base 30 is also formed of dielectric material but need not be formed by chemical vapor deposition. A surface of base 30 is ground and optically polished into a roughly spherical surface corresponding generally to the desired curve of a millimeter wave radio frequency antenna system. A radio frequency ground plane 32 of conductive material such as aluminum or copper is then formed on the spherical surface of base 30 by a thin-film metalization technique well-known in the production of semiconductor integrated circuits. Suitable techniques include vacuum evaporation, RF sputtering, and electroplating.

Additional layers 37 of dielectric material are formed upon the surface of the ground plane 32 and are then ground and polished to a sufficient curvilinear configuration to concentrate radio frequency radiation along antenna beam axis 29. Microstrip column feed line elements 34 forming part of a radio frequency antenna array, to be described in greater detail, are then deposited upon the additional layers of dielectric material through similar metalization techniques in the configuration shown schematically in FIG. 4. Additional layers of dielectric material 39 are then formed on the microstrip column feed line elements 34, followed by the formation of a plurality of radio frequency antenna elements 36 similarly deposited by metalization techniques and also part of the antenna array. Finally, material 35 which is transparent to radio frequency radiation, but is reflective to infrared radiation, is deposited upon radio frequency antenna elements 36 to form a reflective coating. Appropriate material for the reflective coating is magnesium fluoride. The coating is then ground and optically polished to form a high quality reflective surface 38 which is reflective to infrared radiation to form the primary reflective surface of the Cassegrainian optical system.

In accordance with the invention, reflective means reflective to electro-optical radiation are provided for concentrating electro-optical radiation transmitted through window 12 upon detector 24, and for defining electro-optical beam axis 17 coincident with antenna beam axis 29. As embodied herein and as shown in FIG. 2, such reflective means include infrared reflective surface 38 and infrared secondary refector 16. Detector 24 is of known construction and comprises a 32×32 array of individual infrared sensitive elements connected to circuitry 28 and scanned thereby to provide a target image. The invention may include alternative forms of reflective means, such as a single reflective surface which concentrates electro-optical radiation upon an electro-optical detector mounted between window 12 and assembly 14.

Figure 3:
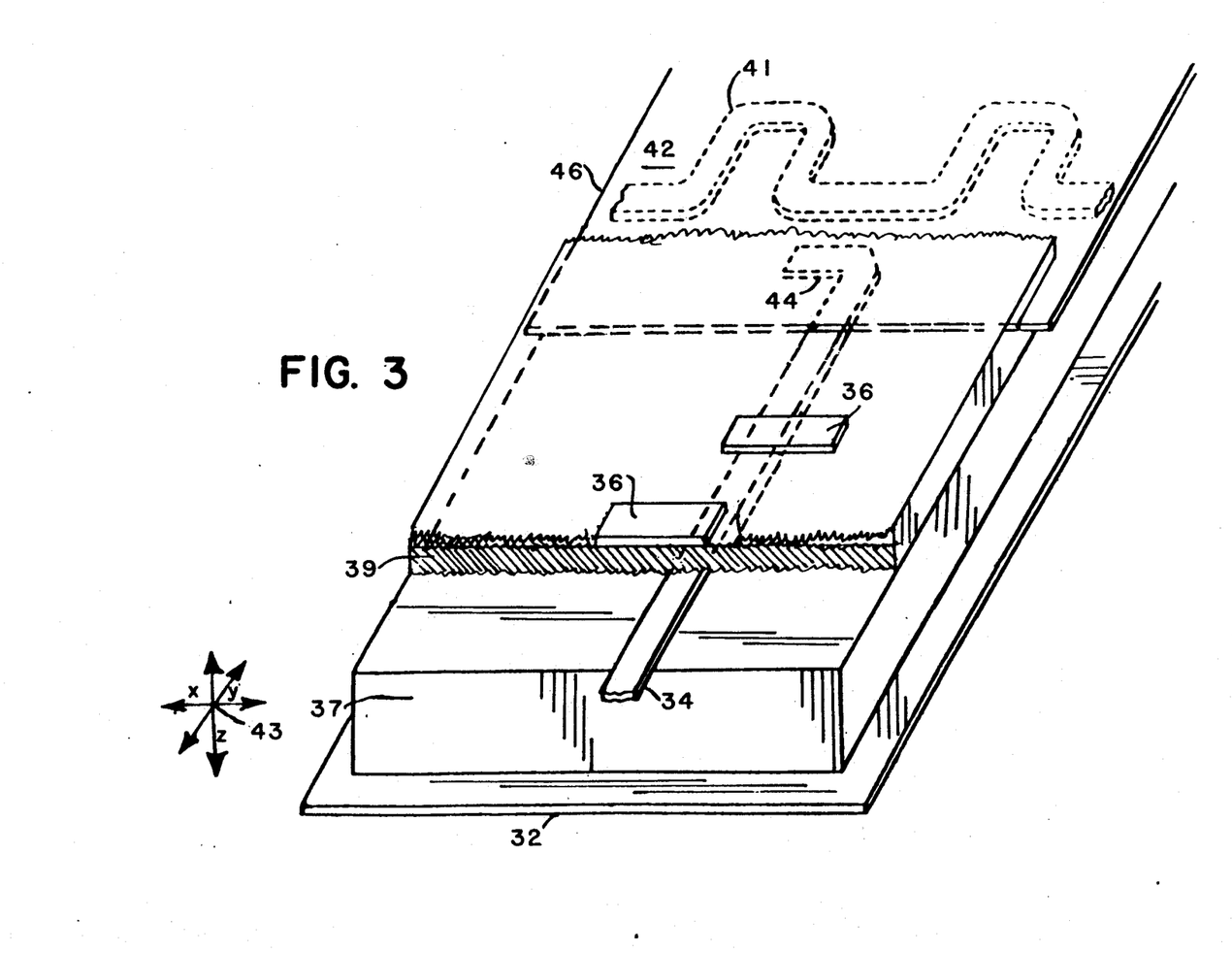
FIG. 3 is a perspective view of a portion of a radio frequency antenna shown in FIGS. 1 and 2.

Referring now to FIG. 3, details of individual microstrip column feed line elements 34 and radio frequency antenna elements 36 are shown. As can be seen, a portion 37 of the substrate dielectric material is formed upon radio frequency ground plane 32. A microstrip column feed line element 34 is then deposited upon the portion 37 by known metalization techniques. Microstrip column feed line elements 34 and dielectric material 37 are optically polished to form a smooth surface. Thus, surface roughness which is deleterious to optimum gain in conventional microstrip antennas or polymeric substrates can be avoided. Additional substrate dielectric material 39 is then deposited.

Figure 4:
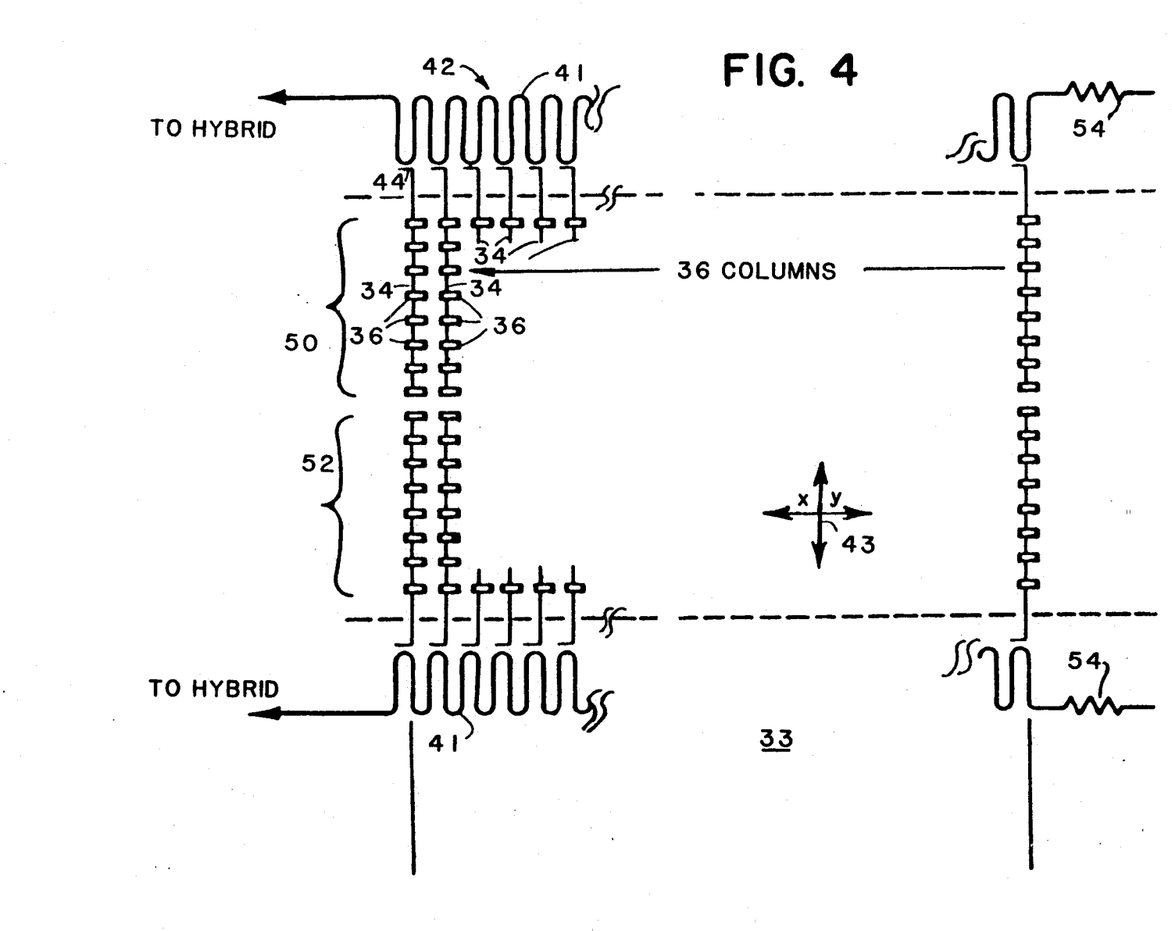
FIG. 4 is a schematic view of the antenna shown in FIGS. 1 and 2.

A plurality of radio frequency antenna elements 36 are then formed along each of the microstrip column feed line elements 34, offset on opposite sides of the microstrip column feed line elements 34 as shown in FIG. 3, to form a radio frequency antenna array 33 shown in FIG. 4. Note from FIGS. 2 and 3 that radio frequency antenna elements 36 are electromagnetically coupled to microstrip column feed line elements 34 and do not have a direct metallic interconnection therebetween. By varying the dielectric spacing between microstrip column feed line elements 34 and radio frequency antenna elements 36, the desired amount of electromagnetic coupling can be obtained.

In accordance with the invention, transmission means coupled to the radio frequency antenna elements 36 is provided for supplying radio frequency energy generated by associated transmitter apparatus to the radio frequency antenna elements to form a beam of radio frequency radiation, and for supplying a second guidance signal to associated receiver apparatus. As embodied herein and as shown in FIG. 4, such transmission means includes microstrip column feed line elements 34, strip line transmission lines 42 including power conductors 41 and ground planes 32 and 46, and electromagnetic directional coupling elements 44.

In a similar manner, each microstrip column feed line element 34 is electromagnetically coupled to a power conductor 41 of a strip line transmission line 42 by an electromagnetic directional coupler element 44. Upper ground plane 46 consists of conductive material such as aluminum or copper which is formed by metalization techniques.

At each metalization stage in the fabrication of the assembly 14, additional dielectric material is deposited to form a surface even with the metal elements. The resultant surface is then optically polished, thus providing antenna elements which are significantly smoother than those produced by printed circuit board techniques. Accordingly, the optimum gain of the microstrip antenna array can be realized.

As can be seen in FIG. 3, power conductor 41 of the strip line transmission line 42 is formed into an undulating serpentine configuration. By varying the frequency of radio frequency energy supplied to strip line transmission line 42, the serpentine configuration of the power conductor 41 allows the radio frequency antenna array 33 to be electronically scanned in a well-known manner over a moderate range in the X direction as shown by orientation arrows 43. As previously mentioned, assembly 14 is mechanically steered by gimbal assembly 26 over a wider range prior to acquisition of a target.

FIG. 4 shows a schematic diagram of a preferred embodiment of the radio frequency antenna array 33, the elements of which are shown in FIGS. 2 and 3. It is to be understood that in the preferred embodiment, the antenna array 33 of reflector assembly 14 is formed in curvilinear coordinates to properly form the antenna beam axis 29 coincident with infrared detector beam axis 17. However, for purposes of illustration in order to understand the principles of the present invention, the schematic diagram of FIG. 4 shows the antenna array 33 in rectilinear coordinates. As can be seen therein, the antenna array 33 includes a plurality of microstrip column feed lines 34 each of which is coupled to a power conductor 41 of a strip line transmission line 42. Each of the microstrip column feed lines 34 in the preferred embodiment also has eight radio frequency antenna elements 36 coupled to it. The number of feedlines 34 and antenna elements 36 and the specific configuration thereof are selected according to principles known in the art.

As is indicated in FIG. 4, in a preferred embodiment a total of 72 microstrip column feed line elements 34 are provided, separated into an upper subarray 50 and a lower subarray 52. For purposes of clarity, not all feed line elements 34 or antenna elements 36 are shown. Each of the subarrays 50 and 52 is connected to a separate power conductor 41 of a strip line transmission line 42. One end of each power conductor 41 is connected through a hybrid coupler (not shown) to a standard radio frequency transmission line such as a wave guide or coaxial cable (also not shown). The other end of each power conductor 41 may be terminated in a matched load 54 as shown in FIG. 4. In some applications, however, load 54 may not be necessary and the end of power conductor 41 opposite the end thereof which is supplied with radio frequency energy may be left open and unterminated.

Microstrip column feed line elements 34 are excited through couplers 44 spaced non-resonantly along an electrically long transmission line. Since power conductor 41 is formed into the serpentine configuration, it becomes a traveling wave network in which a small change in frequency causes a large change in phase between columns. This allows antenna beam axis 29 to be varied in the X direction by changing the frequency of RF radiation supplied to the array. Antenna beam axis 29 is scanned in the Y direction using the well-known monopulse technique by combining power conductors 41 of strip line transmission lines 42 in a hybrid junction such as a conventional "magic tee" RF connector, which accepts signals from two directions and retains phase relationship between both inputs.

In a preferred embodiment, microstrip feed lines 34 are separated by a distance of 0.085 inches in the X direction. The radio frequency antenna elements 36 are spaced 0.0628 inches in the Y direction. The operating frequency of the preferred embodiment is 93 GHz to 95 GHz.

The coupling between radio frequency antenna elements 36 and microstrip column feed line elements 34 can be optimized by varying the position of the antenna elements 36 in the X direction relative to microstrip column feed line elements 34. The coupling between these elements can be further specified by varying the amount of dielectric material deposited between them, that is, the thickness of dielectric in the Z direction as shown in FIG. 3.

In operation, pulses of radio frequency energy formed by circuitry 28 in a well-known manner are supplied through conductors 41 to the antenna array 33. A beam of radio frequency radiation parallel to the antenna beam axis 29 is thus formed and transmitted through cover 12. Assembly 14 is then mechanically scanned on gimbal assembly 26 until radio frequency radiation is reflected from a target through window 12, also parallel to the antenna beam axis 29. In addition, infrared radiation from the target also transmitted through the window 12 along the infrared detector beam axis 17 is concentrated by the Cassegrainian optical system consisting of reflective surface 38 and secondary refector 16, and supplied to detector 24. Detector 24 then produces an output signal which constitutes a first guidance signal to be supplied to electronic circuitry 28.

Reflected radio frequency energy from the target received by the antenna array 33 forms a signal in the power conductors 41 of the antenna array which serves as a second guidance signal to be supplied to associated receiving apparatus within circuitry 28. Circuitry 28 then uses the first and second guidance signals to provide appropriate commands to steer the missile toward the target.

The process of fabricating assembly 14 which includes the combination of chemical vapor deposition of dielectric material and metalization of the antenna elements produces a rigid structure which is not mechanically susceptible to distortion by the severe environmental conditions under which such apparatus must operate. Thus, the radiation pattern of antenna beam axis 29 can be reliably maintained under such adverse environmental conditions. In addition, there are no air gaps between various layers of the reflector assembly. It has been determined that a one micron air gap such as is typically present in antennas employing printed circuit board techniques can reduce the gain of an antenna operating at a wavelength of 119 micrometers by 30 percent. Although the preferred embodiment of the present invention operates at millimeter wavelengths and the air gap would not produce as severe a degradation of antenna gain as at micrometer wavelengths, the invention completely avoids problems produced by air gaps between antenna elements.

It will be apparent to those skilled in the art that various modifications and variations can be made in the guidance apparatus of the present invention. For example, in the preferred embodiment, infrared reflective surface 38 is formed on the front surface of assembly 14. Thus, microstrip column feed line elements 34 and radio frequency antenna elements 36 do not provide any shadowing of infrared radiation to detector 24. In some applications, however, it may be desirable to provide infrared reflective surface 28 on the opposite side of substrate 31 from microstrip column feed line elements 34 and radio frequency antenna elements 36. In such case, ground plane 32 can be formed of material which is reflective to infrared radiation as well as to radio frequency radiation. Ground plane 32 in such an alternative embodiment is optically polished to provide the desired infrared optical characteristics.

An alternative electro-optical radiation detector 24 may be provided which is sensitive to radiation other than infrared radiation, such as an ultraviolet radiation detector or a visible light detector array including charge-coupled devices or television imaging tubes.

In another alternative embodiment, separate power conductors 41 could be supplied to connect each column feed line element 34 with a separate associated source of radio frequency energy. Furthermore, the antenna elements 36 are not limited to dipole configuration, but could be in other configurations such as rectangular forms, to yield alternative polarization characteristics.

The invention is also not limited to tactical guided missile applications but may be applied to other environments where the production of guidance signals is required, such as space defense systems. Thus, it is intended that the present invention cover the modifications and variations of this invention, provided they come within the scope of the appended claims and their equivalents.

What is claimed is:

1. Apparatus for producing guidance signals relative to a target in conjunction with associated transmitter and receiver apparatus comprising:
   a) a window transparent to both electro-optical and radio frequency radiation;
   b) an electro-optical radiation detector positioned behind said window and producing a first guidance signal upon detection of electro-optical radiation from the target;

c) a dual reflector-antenna assembly positioned behind said window comprising:
  i) a chemical vapor deposited substrate of dielectric material,
  ii) a plurality of radio frequency antenna elements supported by said substrate and arranged to define an antenna beam axis, and
  iii) reflective means reflective to electro-optical radiation for concentrating electro-optical radiation transmitted through said window upon said electro-optical radiation detector, and for defining an electro-optical detection beam axis coincident with said antenna beam axis; and d) transmission means coupled to said radio frequency antenna elements for supplying radio frequency energy generated by associated transmitter apparatus to said radio frequency antenna elements to form a beam of radio frequency radiation and for supplying a second guidance signal to associated receiver apparatus, said second guidance signal corresponding to radio frequency radiation reflected from a target through said window along said antenna beam axis.

2. Apparatus as recited in claim 1 wherein said antenna elements are resonant at frequencies in the millimeter wave range.

3. Apparatus as recited in claim 2 wherein said antenna elements are embedded within said substrate.

4. Apparatus as recited in claim 3 wherein said antenna elements are optically polished.

5. Apparatus as recited in claim 2 wherein said antenna elements comprise microstrip antenna elements and said dual reflector-antenna assembly comprises a ground plane coupled to said transmission line.

6. Apparatus as recited in claim 5 wherein said ground plane is reflective to electro-optical radiation.

7. Apparatus as recited in claim 5 wherein said microstrip antenna elements are formed by a thin-film metalization process.

8. Apparatus as recited in claim 5 wherein said transmission means comprises a transmission line having a portion formed into a serpentine configuration.

9. Apparatus as recited in claim 8 wherein said a serpentine configured portion is formed by a thin-film metalization process.

10. Apparatus as recited in claim 2 wherein said reflective surface is positioned between said window and said antenna elements and is transparent to radio frequency radiation.

11. Apparatus as recited in claim 2 wherein said electro-optical radiation detector comprises an imaging array of infrared sensitive elements.

12. Apparatus as recited in claim 11 wherein said imaging array is attached to said dual reflector-antenna assembly.

13. Apparatus as recited in claim 11 wherein said reflective means comprises a secondary reflector, wherein said reflective surface comprises a region transparent to infrared radiation, and wherein said reflector assembly and said secondary reflector are arranged in a Cassegrainian optical configuration.

14. Apparatus as recited in claim 13 further comprising means for mechanically scanning said dual reflector-antenna assembly.

15. Apparatus as recited in claim 14 wherein said imaging array is positioned in the optical focal plane of said Cassegrainian optical configuration.

16. Apparatus for producing guidance signals relative to a target in conjunction with associated transmitter and receiver apparatus comprising:

a) a window transparent to both infrared and radio frequency radiation;

b) an infrared detector positioned behind said window and producing a first guidance signal upon detection of infrared radiation from the target;

c) a dual reflector-antenna assembly positioned behind said window comprising:
  i) a chemical vapor deposited substrate of dielectric material,
  ii) a plurality of radio frequency antenna elements formed upon said substrate and arranged to define an antenna beam axis, and
  iii) reflective means reflective to infrared radiation and supported upon said substrate for receiving infrared radiation transmitted through said window, for concentrating said transmitted infrared radiation upon said infrared detector, and for defining an infrared detection beam axis coincident with said antenna beam axis; and d) a transmission line coupled to said radio frequency antenna elements, said transmission line supplying radio frequency energy generated by associated transmitter apparatus to said radio frequency antenna elements to form a beam of radio frequency radiation, said transmission line also supplying a second guidance signal to associated receiver apparatus, said second guidance signal corresponding to radio frequency radiation reflected from a target through said window along said antenna beam axis.

17. Apparatus for producing guidance signals for a tactical missile in conjunction with associated transmitter and receiver apparatus, comprising:

a) a window transparent to both infrared and radio frequency radiation;

b) an infrared detector producing a first guidance signal upon detection of infrared radiation from a target;

c) a dual reflector-antenna assembly positioned behind said window comprising:
  i) a chemical vapor deposited substrate of dielectric material, said substrate having an aperture therethrough and supporting said infrared detector at the end of said aperture opposite said window;
  ii) a plurality of microstrip radio frequency antenna elements formed within said substrate by metalization techniques and arranged in an array to define an antenna beam axis, and
  iii) a reflective surface reflective to infrared radiation and transparent to radio frequency radiation formed on the side of said substrate closest to said window, and said reflective surface concentrating infrared radiation transmitted through said window parallel to an infrared detection axis coincident with said antenna beam axis;

d) a secondary reflector positioned between said window and said reflector assembly to form a Cassegrainian optical system with said reflective surface, said secondary reflector reflecting said concentrated infrared radiation through said aperture to said infrared detector; and e) a transmission line coupled to said antenna elements and supplying radio frequency energy generated by associated transmitter apparatus to said antenna elements to form a beam of radio frequency radiation coincident with said antenna beam axis, said transmission line also supplying a second guidance signal to associated receiver apparatus, said second guidance signal corresponding to radio frequency radiation reflected from a target through said window along said antenna beam axis.

18. A method for forming a dual reflector-antenna assembly for guidance signal producing apparatus, comprising the steps of:

forming a base of dielectric material;

polishing the base into a curved surface corresponding generally to the desired curve of a radio frequency antenna system;

forming a radio frequency ground plane of conductive material on the curved surface by a thin-film metalization process;

forming first layers of dielectric material by a chemical vapor deposition process upon the ground plane;

polishing the first dielectric layers;

depositing a plurality of radio frequency antenna components by a thin-film metalization process upon the first dielectric layers;

depositing second layers of dielectric material by a chemical vapor deposition process to form a surface even with the antenna components;

polishing the even surface;

depositing material transparent to radio frequency radiation and reflective to electro-optical radiation by a chemical vapor deposition process upon the polished even surface to form a reflective coating; and polishing the reflective coating to form a high quality reflective surface.

19. A method as recited in claim 18 wherein the steps of depositing antenna components and depositing second layers of dielectric material to form a surface even with the antenna components comprise the substeps of:

depositing microstrip column feed line elements by a thin-film metalization process upon the first dielectric layers;

depositing second layers of dielectric material by a chemical vapor deposition process to form a first surface even with the microstrip column feed line elements;

optically polishing the first even surface;

forming third layers of dielectric material upon the polished first even surface;

depositing a plurality of radio frequency antenna elements by a thin-film metalization process upon the third layers; and depositing fourth layers of dielectric material by a chemical vapor deposition process to form a second surface even with the antenna elements.

* * * * *